(12) United States Patent
Zhao et al.

(10) Patent No.: US 8,811,433 B2
(45) Date of Patent: *Aug. 19, 2014

(54) METHOD, SYSTEM AND DEVICE FOR UPLINK SYNCHRONIZATION

(75) Inventors: Yali Zhao, Beijing (CN); Fangli Xu, Beijing (CN); Fei Qin, Beijing (CN); Guoqing Li, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 72 days.

This patent is subject to a terminal disclaimer.

(21) Appl. No.: 13/501,062

(22) PCT Filed: Sep. 30, 2010

(86) PCT No.: PCT/CN2010/001546
§ 371 (c)(1),
(2), (4) Date: May 15, 2012

(87) PCT Pub. No.: WO2011/041936
PCT Pub. Date: Apr. 14, 2011

(65) Prior Publication Data
US 2012/0218987 A1    Aug. 30, 2012

(30) Foreign Application Priority Data
Oct. 10, 2009 (CN) .......................... 2009 1 0235660

(51) Int. Cl.
*H04J 3/06* (2006.01)
*H04L 27/26* (2006.01)
*H04L 7/00* (2006.01)
*H04W 56/00* (2009.01)

(52) U.S. Cl.
CPC ........... *H04L 27/2657* (2013.01); *H04L 7/0083* (2013.01); *H04W 56/00* (2013.01)

USPC .......................................... 370/510

(58) Field of Classification Search
CPC ...... H04W 56/00; H04W 56/001; H04L 7/00; H04L 7/0083; H04L 7/0029; H04L 27/2657
USPC .......................................... 370/510
See application file for complete search history.

(56) References Cited

U.S. PATENT DOCUMENTS

2010/0238908 A1* 9/2010 Wu .............................. 370/336
2011/0243111 A1* 10/2011 Andgart et al. .............. 370/338
(Continued)

FOREIGN PATENT DOCUMENTS

CN    101388722    3/2009
CN    101540634    9/2009
(Continued)

OTHER PUBLICATIONS

International Search Report for PCT/CN2010/001546 DTD Dec. 30, 2010 (with English translation).
(Continued)

*Primary Examiner* — Phuc Tran
(74) *Attorney, Agent, or Firm* — Foley & Lardner LLP; James F. Ewing; Paul M. H. Pua

(57) ABSTRACT

A method for uplink synchronization in a multi-carrier system includes the following steps: a base station selects one or more first component carriers, which do not establish the uplink synchronization with the base station, from multiple component carriers supported by a terminal; then the base station obtains Timing Advance (TA) needed by the terminal to perform the uplink transmission on the first component carriers, and sends the TA information to the terminal; the terminal performs the uplink transmission on said first component carriers according to said TA. The application of the present invention enables the establishment of uplink synchronization between the base station and the user equipment in multi-carrier system.

17 Claims, 5 Drawing Sheets

(56) References Cited

U.S. PATENT DOCUMENTS

2012/0063425 A1* 3/2012 Wang et al. .................. 370/336
2012/0099577 A1* 4/2012 Baldemair et al. ............ 370/338

FOREIGN PATENT DOCUMENTS

| CN | 101540978 | 9/2009 |
| EP | 2432286 | 3/2012 |
| WO | WO-2009/088204 | 7/2009 |
| WO | WO-2010/053334 | 5/2010 |
| WO | WO-2011/098186 | 8/2011 |

OTHER PUBLICATIONS

Communication pursuant to Article 94(3) EPC for European Patent Application No. 10821545.0 mailed Mar. 5, 2014.

Extended European Search Report for European Patent Application No. 10821545.0 mailed Apr. 18, 2013.

Huawei: "Different Timing Advance Impact on Carrier Aggregation", 3GPP TSG RAN WG2 Meeting #67bis; R2-095815; Miyazaki, Japan, Oct. 12-Oct. 16, 2009.

Nokia Corporation et al: "RACH and carrier aggregation", 3GPP TSG RAN WG2 Meeting #67bis; R2-095898; Miyazaki, Japan, Oct. 12-Oct. 16, 2009.

Huawei: "Issues in carrier aggregation", 3GPP TSG WG1 Meeting #57bis; R1-092377; Los Angeles, USA, Jun. 29-Jul. 3, 2009.

Nokia Siemens Networks et al: "Carrier Aggregation and Timing Advance", 3GPP TSG-RAN WG2 Meeting #67bis; R2-095519; Miyazaki, Japan, Oct. 12-Oct. 16, 2009.

* cited by examiner

--Prior Art--

--Prior Art--

--Prior Art--

METHOD, SYSTEM AND DEVICE FOR UPLINK SYNCHRONIZATION

This application is a US National Stage of International Application No. PCT/CN2010/001546, filed 30 Sep. 2010, designating the United States, and claiming priority to Chinese Patent Application No. 200910235660.7, filed with the China State Intellectual Property Office on Oct. 10, 2009 and entitled "Uplink synchronization method, system and device", which is hereby incorporated by reference in its entirety.

FIELD OF THE INVENTION

The present invention relates to the field of radio communications and particularly to an uplink synchronization method, system and device.

BACKGROUND OF THE INVENTION

Significantly improved peak rates of 1 Gbps in the downlink and 500 Mbps in the uplink are required for a Long Term Evolution-Advanced (LTE-A) system as compared to a Long Term Evolution (LTE) system. Also good compatibility of the LTE-A system with the LTE system is required. Carrier Aggregation (CA) is introduced to the LTE-A system to accommodate the required improved peak rates, compatibility with the LTE system and full use of spectrum resources.

Carrier aggregation refers to presence of a plurality of component carriers (CCs) in both the uplink and the downlink in a cell instead of an approach in which there is only one pair of carriers in the LTE system and earlier radio communication systems. In the system with carrier aggregation, the respective component carriers may be consecutive or inconsecutive, the maximum bandwidth of each component carrier is 20 MHz for compatibility with the LTE system, and the bandwidths of the component carriers may be the same or different.

A random access of a User Equipment (UE) in the LTE system arises generally from the following several reasons.

In a first case, a User Equipment (UE) in a Radio Resource Control Idle (RRC_IDLE) status accesses the system, which is also referred to as an initial access.

In a second case, a UE initiates a random access after a radio link fails, which is also deemed as an initial access.

In a third case, a random access is required for a UE during a cell handover.

In a fourth case, a UE in a Radio Resource Control Connected (RRC_CONNECTED) status has downlink data incoming.

In a fifth case, a UE in an RRC_CONNECTED status has uplink data incoming.

In the third and fourth cases, if there is a dedicated preamble, a non-contention random access can be available, and FIG. 1 illustrates a non-contention random access procedure which generally includes the following three steps.

For a message 0: An eNodeB (eNB) assigns a UE with an index of a random access preamble (ra-PreambleIndex) for a non-contention random access and a mask index of a physical random access channel for the random access (ra-PRACH-MaskIndex). For a non-contention random access due to incoming downlink data, the ra-PreambleIndex and the ra-PRACH-MaskIndex are transmitted to the UE over a Physical Downlink Control Channel (PDCCH), and for a non-contention random access due to a handover, the ra-PreambleIndex and the ra-PRACH-MaskIndex are carried in a handover command transmitted to the UE.

For a message 1: The UE transmits the dedicated preamble specified in the message 0 to the eNodeB over the PRACH resource specified in the ra-PRACH-MaskIndex according to the received ra-PreambleIndex and ra-PRACH-MaskIndex. The eNodeB calculates an uplink Timing Advance (TA) from the message 1 upon reception of the message 1.

For a message 2: The eNodeB transmits a random access response including the uplink TA to the UE to notify the UE of the timing advance for subsequent uplink transmission.

A contention random access can be available to a random access due to any of the other random access reasons, and FIG. 2 illustrates a contention random access procedure which generally includes the following four steps.

For a message 1: A UE selects a random access preamble and a PRACH resource and transmits the selected random access preamble to an eNodeB over the PRACH resource.

For a message 2: The eNodeB calculates an uplink TA upon reception of the preamble and transmits to the UE a random access response including at least the uplink TA and a UL grant for a message 3.

For the message 3: The UE performs uplink transmission over the UL grant specified in the message 2, and the contents of the uplink transmission of the message 3 vary from one random access reason to another, for example, a Radio Resource Control (RRC) connection establishment request is transmitted in the message 3 for a random access reason of an initial access.

For a message 4: The eNodeB transmits a contention resolution message to the UE, and the UE can judge from the message 4 whether the random access succeeds.

The UE performs establishment of uplink synchronization according to the uplink TA acquired in the foregoing random access flow. The uplink synchronization is for the purpose of keeping the UE and the eNodeB in uplink synchronization so that the UE transmits uplink data and also transmits feedback information of a Hybrid Automatic Repeat Request (HARQ) for downlink data.

Uplink synchronization has to be maintained after the uplink synchronization is established. Uplink synchronization is maintained by the eNodeB as stipulated in the LTE system. FIG. 3 illustrates an uplink synchronization maintenance procedure where the eNodeB and the UE maintain an uplink TA timer (TAT) respectively; the eNodeB recalculates an uplink TA according to uplink transmission of the UE and then transmits a Time Advance command (TA command) including the uplink TA to the UE and starts the TAT; if the UE can not receive the TA command correctly, the UE transmits a Negative Acknowledgement (NACK) message to the eNodeB, and the eNodeB retransmits a TA command and restarts the TAT after a period of time, T1; or if the UE receives the TA command correctly, the UE starts the TAT of the UE and transmits an Acknowledgement (ACK) message to the eNodeB, and the UE performs uplink transmission according to the TA in the TA command; and the eNodeB restarts the TAT of the eNodeB upon reception of the ACK message transmitted from the UE. The eNodeB performs the foregoing procedure at an interval of time, T2, which is shorter than the length of timing of the TAT. The eNodeB considers a specific UE as being synchronized if its TAT for the UE is not timeout. The UE considers itself as being synchronized if the TAT maintained by the UE itself is not timeout.

The inventors have identified during making of the invention the following technical problem in the prior art.

An uplink synchronization establishment and maintenance method for an LTE-A multi-carrier system has been absent so far, thus making it impossible to perform uplink synchronization between an eNodeB and a UE in the multi-carrier system.

SUMMARY OF THE INVENTION

Embodiments of the invention provide an uplink synchronization method, system and device in order to address the problem of being impossible to perform uplink synchronization between an eNodeB and a UE in an LTE-A multi-carrier system.

An uplink synchronization method in a multi-carrier system includes:

selecting, by an eNodeB, one or more first component carriers which have not acquired uplink synchronization with the eNodeB from a plurality of component carriers supported by a user equipment;

acquiring, by the eNodeB, a Timing Advance (TA) of the first component carrier; and transmitting, by the eNodeB, the TA of the first component carrier to the user equipment to instruct the user equipment to perform uplink transmission over the first component carrier according to the TA.

An uplink synchronization method in a multi-carrier system includes:

receiving, by a user equipment, a TA of one or more first component carriers transmitted from an eNodeB, where the first component carrier is such a component carrier among a plurality of component carriers supported by the user equipment that has no uplink synchronization established with the eNodeB; and performing, by the user equipment, uplink transmission over the first component carrier according to the TA.

An eNodeB includes:

a synchronized carrier selecting unit configured to select one or more first component carriers which have not acquired uplink synchronization with the eNodeB from a plurality of component carriers supported by a user equipment; and an instructing unit configured to acquire a TA of the first component carrier, and transmit the TA of the first component carrier to the user equipment to instruct the user equipment to perform uplink transmission over the first component carrier according to the TA.

A user equipment includes:

a command receiving unit configured to receive a TA of one or more first component carriers transmitted from an eNodeB, where the first component carrier is such a component carrier among a plurality of component carriers supported by the user equipment that has no uplink synchronization established with the eNodeB; and an uplink transmitting unit configured to perform uplink transmission over the first component carrier according to the TA.

In the technical solutions according to the embodiments of the invention, an eNodeB selects one or more first component carriers which have not acquired uplink synchronization with the eNodeB from a plurality of component carriers supported by a user equipment and transmits a TA of the first component carrier to the user equipment, and the user equipment performs uplink transmission over the first component carrier according to the TA. Apparently the technical solutions according to the embodiments of the invention can establish uplink synchronization between the eNodeB and the UE in the multi-carrier system.

DETAILED DESCRIPTION OF THE EMBODIMENTS

In order to address the problem of being impossible to perform uplink synchronization between an eNodeB and a UE in an LTE-A multi-carrier system, an embodiment of the invention provides an unlink synchronization method in a multi-carrier system, and in this method, an eNodeB transmits TA of a component carrier, for which uplink synchronization is to be established, to a user equipment, and the user equipment performs uplink transmission over the component carrier according to the TA to thereby establish uplink synchronization with the eNodeB.

The following four scenarios can be specified for respective CCs with the same or different TAs.

Figure 4A:
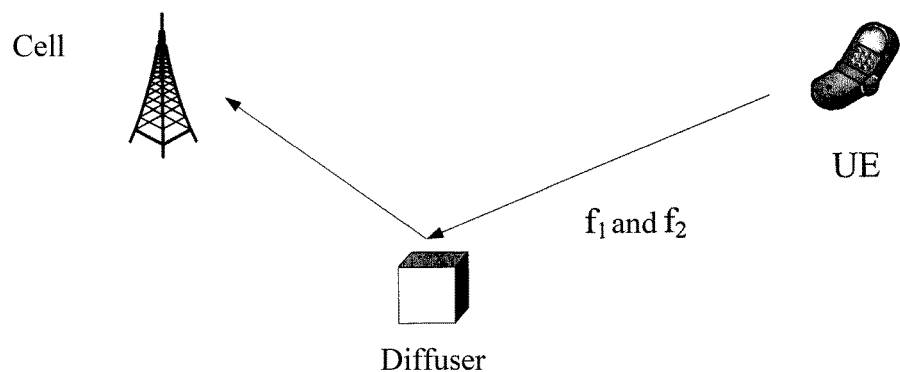
FIG. 4A is a schematic diagram of a first application scenario of a method according to an embodiment of the invention.

In a first scenario, TAs of respective CCs are same with absence of a repeater, a Radio Remote Unit (RRU) and Coordinated Multi-Point (CoMP) transmission/reception, as illustrated in FIG. 4A.

Figure 4B:
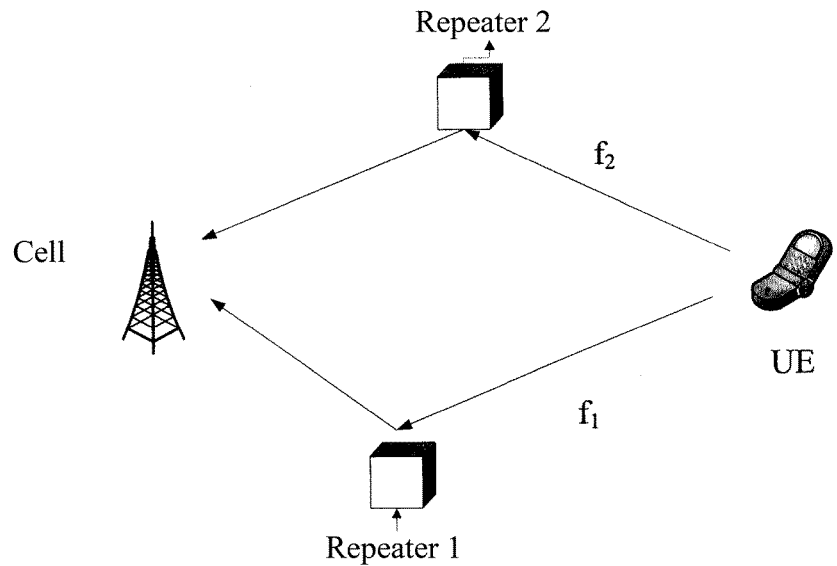
FIG. 4B is a schematic diagram of a second application scenario of the method according to an embodiment of the invention.

In a second scenario, TAs of respective CCs may be different with presence of a repeater with different frequency selectivity, as illustrated in FIG. 4B.

Figure 4C:
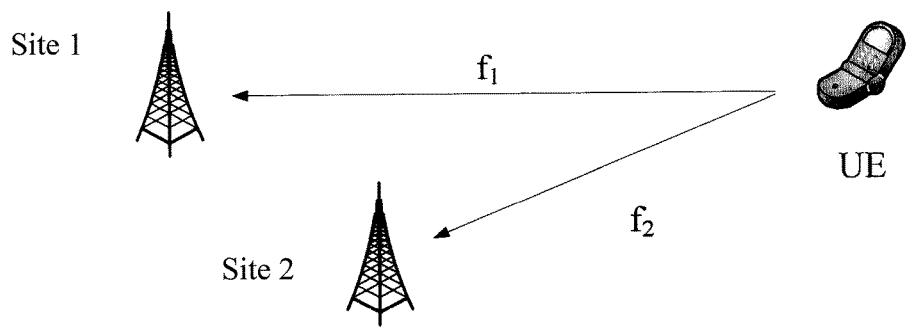
FIG. 4C is a schematic diagram of a third application scenario of the method according to an embodiment of the invention.

In a third scenario, TAs of respective CCs may be different with non-collocated sites where different CCs transmit over different sites, as illustrated in FIG. 4C.

In a fourth scenario, a UE has different TAs for different cooperative sites for uplink CoMP.

A procedure will be described by describing firstly an implementation of a user equipment and an eNodeB in cooperation and then respective implementations of the user equipment and the eNodeB, but this will not imply their required implementation in cooperation. Actually the user equipment and the eNodeB can also implement separately to thereby address respective issues at the user equipment and the eNodeB although a better technical effect can be achieved if they implement in combination.

Figure 5:
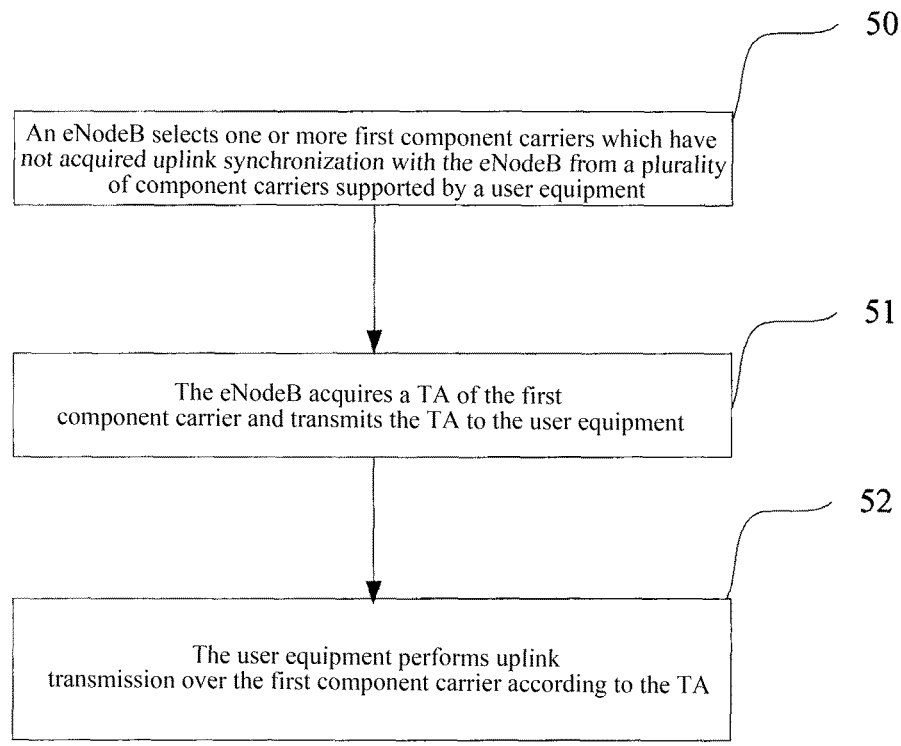
FIG. 5 is a schematic flow chart of a method according to an embodiment of the invention.

Reference is made to FIG. 5 illustrating an uplink synchronization method in a multi-carrier system according to an embodiment of the invention, which includes the following steps.

In a step 50, an eNodeB selects one or more first component carriers which have not acquired uplink synchronization with the eNodeB from a plurality of component carriers supported by a user equipment.

In a step 51, the eNodeB acquires a TA of the first component carrier and transmits the TA to the user equipment.

In a step 52, the user equipment performs uplink transmission over the first component carrier according to the TA upon reception of the TA of the first component carrier.

The eNodeB can acquire the TA of the first component carrier in the step 52 in the following two approaches.

In a first approach, the eNodeB transmits an identifier of the first component carrier to the user equipment in random access related instruction signaling, and the user equipment transmits a random access preamble to the eNodeB over the first component carrier upon reception of the random access related instruction signaling; the eNodeB calculates the TA used for the user equipment to perform uplink transmission over the first component carrier upon reception of the random access preamble and transmits a random access response which includes the TA to the user equipment; and the user equipment reads the TA from the random access response.

This approach can be applicable to the foregoing second and third scenarios.

In a second approach, the eNodeB determines a second component carrier among a plurality of component carriers supported by the eNodeB which has acquired uplink synchronization with the eNodeB and determines a TA used to perform uplink transmission over the second component carrier as the TA used to perform uplink transmission over the first component carrier.

This approach can also be applicable to the foregoing second and third scenarios.

The non-contention random access flow or the contention random access flow can be performed in the first approach. In the non-contention random access flow, the eNodeB carries the identifier of the first component carrier over which a random access is to be performed, an index of the random access preamble (ra-PreambleIndex) used over the first component carrier and a mask index of a physical random access channel resource (ra-PRACH-MaskIndex) for the random access in the random access related instruction signaling and transmits the signaling to the user equipment; and the user equipment transmits the random access preamble corresponding to the ra-PreambleIndex to the eNodeB over the PRACH resource indicated by the ra-PRACH-MaskIndex over the first component carrier indicated by the identifier of the first component carrier. In the contention random access flow, the user equipment itself selects a random access preamble and a PRACH resource for the random access and transmits the selected random access preamble to the eNodeB over the first component carrier over the selected PRACH resource.

The random access related instruction signaling includes but will not be limited to Radio Resource Control (RRC) signaling or signaling conveyed by a Physical Downlink Control Channel (PDCCH) or signaling conveyed by the Media Access Control Element (MAC CE) or other signaling. A specific MAC CE can include a Logical Channel ID (LCID) field and a component carrier identifier field, where the LCID field carries information indicating that the MAC CE is an MAC CE instructing the user equipment to perform uplink synchronization, and the component carrier identifier field carriers the identifier of the first component carrier.

Particularly, one or more Uplink Component Carriers (UL CCs) will be instructed over a Downlink Component Carrier (DL CC) to perform a random access to acquire a timing advance of uplink synchronization in the first approach. A contention random access or a non-contention random access can be performed for the random access. The first approach can be applicable to the following situations.

In a first situation, the UE with an initial access establishes uplink synchronization over a UL CC, and then the UE will establish uplink synchronization over other CCs for the purpose of being extended to CA transmission.

In a second situation, the UE handed over to a new cell initially establishes uplink synchronization over a CC and will establish uplink synchronization over other CCs if it is extended to CA transmission.

In a third situation, the UE with a new service being established requires a larger number of carriers and will activate other CCs and perform uplink synchronization over the CCs.

In the foregoing three situations, an RRC reconfiguration process will be performed when single-carrier transmission is extended to CA transmission or the number of currently used CCs is extended, where the index of a CC for which uplink synchronization is to be performed is carried in an RRC reconfiguration message particularly as follows.

If a non-contention random access is performed, the RRC reconfiguration message may include the index of a UL CC for which uplink synchronization is to be performed (CC_index), the index of the random access preamble (ra-PreambleIndex) used to initiate the random access over the UL CC and the mask index of a PRACH resource for the random access (ra-PRACH-MaskIndex).

If a contention random access is performed, the RRC reconfiguration message may include the index of a UL CC for which uplink synchronization is to be performed (CC_index).

In a fourth situation, the UE deactivates some carriers when there is a small amount of data and will activate other CCs and establish uplink synchronization over these CCs when there is a larger amount of data.

In this situation, a random access can be controlled at the Media Access Control (MAC) layer.

If there is a dedicated preamble, the non-contention random access flow is performed, and the eNodeB may indicate over a PDCCH which includes at least the index of a UL CC for which uplink synchronization is to be performed (CC_index), the index of a random access preamble (ra-PreambleIndex) used to initiate the random access over the UL CC and the mask index of a physical random access channel resource for the random access (ra-PRACH-MaskIndex).

Figure 6:
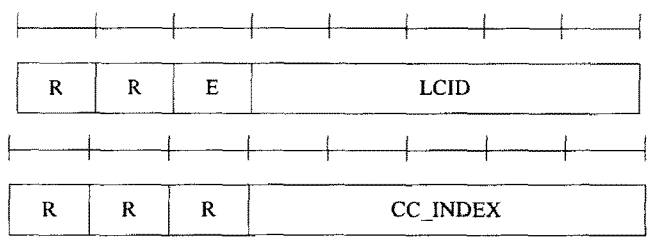
FIG. 6 is a schematic structural diagram of an MAC CE according to an embodiment of the invention.

If there is no dedicated preamble, the eNodeB can introduce new signaling, e.g., a random access instruction information element at the Media Access Control layer (MAC CE), to notify the UE of the index of a carrier over which a random access is to be performed, possibly in the format as illustrated in FIG. 6, where:

R: a reserved bit field which is typically set to 0;

E: an extension field which is set to 1 indicating that the next byte includes at least R/R/E/LCID fields or to 0 indicating that the next byte includes a MAC Service Data Unit (SDU) or an MAC CE or padding;

LCID: Logical Channel Identifier which carries information indicating that the MAC CE is an MAC CE instructing the user equipment to perform uplink synchronization and that the MAC CE is an MAC CE for a random access instruction, where an LCID reserved in the existing LTE system can be used; and CC_INDEX: Component Carrier Index field which is represented in a bitmap with each bit corresponding to one CC, where, for example, the bit is set to 1 indicating that a random access is to be performed over the corresponding UL CC to perform uplink synchronization or to 0 indicating that no process is to be performed. For the LTE-A, the largest number of carriers is five, so five bits will be sufficient in an implementation, and for another multi-carrier system, the length of CC_INDEX can be extended if the number of CCs is larger than five.

Alternatively, in the foregoing first, second and third situations, firstly uplink synchronization can be performed as in the fourth situation and then an RRC reconfiguration message can be transmitted after synchronization.

The second approach is applicable to the same situations as the first approach, but the random access procedure in the first approach is omitted in the second approach, thereby reducing a signaling overhead and a delay of a random access.

Before the eNodeB acquires the TA of the first component carrier, the eNodeB can select one of the foregoing first and second approaches and a third approach for acquiring the TA of the first component carrier according to one or any combination of network configuration of the multi-carrier system, the capability of a user equipment and statistic information of TAs used to perform uplink transmission over the component carriers supported by the user equipment.

The third approach refers to that uplink synchronization is established and maintained based on a specific uplink component carrier (UL CC), that is, the user equipment performs uplink transmission over other uplink component carriers according to a TA of the specific uplink component carrier or a TA with a constant offset from the TA of the specific uplink component carrier, and this approach can be applicable to most of the scenarios, e.g., the foregoing first scenario.

The eNodeB can select the first approach or the second approach or the third approach in the following two methods.

In a first method, the eNodeB selects one of the approaches according to the network configuration and the capability of a user equipment.

For example, the eNodeB selects the first approach for all the UEs serviced by the eNodeB if the network configuration is the foregoing first scenario.

The eNodeB may select one of the approaches according to the network configuration in combination with the capability of a UE if the network configuration is the foregoing second, third or fourth scenario. For example, the third approach is selected for a UE which does not support aggregation of CCs with different TAs; and for other UEs, information on the differences between TAs of a plurality of uplink CCs aggregated for respective user equipments in a cell can be derived from historical statistic information, differences between TAs of the respective uplink CCs in the cell can be predicted from the information, and if the differences fall into a specific range, the first approach is selected; otherwise, the second approach is selected.

In a second method, the eNodeB selects one of the approaches according to statistic information of TAs used to perform uplink transmission over component carriers supported by a user equipment.

For example, the eNodeB derives information on the differences between TAs of a plurality of uplink CCs aggregated for respective user equipments in a cell from historical statistic information, predicts differences between TAs of the respective uplink CCs in the cell from the information, and selects the third approach if there is substantially no difference, selects the first approach if the differences fall into a specific range or selects the second approach otherwise.

After the user equipment performs uplink transmission over the first component carrier according to the acquired TA, uplink synchronization may be maintained over the first component carrier in the following two ways.

In a first way, the eNodeB and the user equipment maintain a synchronization timer (TAT) respectively for each first component carrier and perform the following steps for each first component carrier:

the bases station recalculates a TA of the first component carrier according to the uplink transmission of the user equipment over the first component carrier, transmits a Timing Advance command (TA command) including the TA to the user equipment and starts the TAT, maintained by the eNodeB, corresponding to the first component carrier, at a preset interval of time which is shorter than a length of timing of the TAT;

if the user equipment does not receive the TA command correctly, the user equipment transmits a Negative Acknowledgement (NACK) message to the eNodeB, and the eNodeB retransmits a TA command to the user equipment and restarts the TAT, maintained by the eNodeB, corresponding to the first component carrier, upon reception of the NACK message; or if the user equipment receives the TA command correctly, the user equipment performs uplink transmission over the first component carrier according to the TA in the TA command, starts the TAT, maintained by the user equipment, corresponding to the first component carrier and transmits an Acknowledgement (ACK) message to the eNodeB, and the eNodeB restarts the TAT, maintained by the eNodeB, corresponding to the first component carrier upon reception of the ACK message;

if the TAT, maintained by the eNodeB, corresponding to the first component carrier is time out, the eNodeB determines that the first component carrier is out of synchronization; and if the TAT, maintained by the user equipment, corresponding to the first component carrier is time out, the user equipment determines that the first component carrier is out of synchronization.

In a second way, the first component carriers are grouped, and TA differences of the first component carriers in one group do not exceed a preset threshold; and the eNodeB and the user equipment maintain a TAT respectively for each group and perform the following steps for each group:

the bases station recalculates TAs of the respective first component carriers in the group according to the uplink transmission of the user equipment over the respective first component carriers in the group, transmits a TA command including the respective TAs to the user equipment and starts the TAT, maintained by the eNodeB, corresponding to the group, at a preset interval of time which is shorter than a length of timing of the TAT;

if the user equipment does not receive the TA command correctly, the user equipment transmits an NACK message to the eNodeB, and the eNodeB retransmits a TA command to the user equipment and restarts the TAT, maintained by the eNodeB, corresponding to the group, upon reception of the NACK message; or if the user equipment receives the TA command correctly, the user equipment performs uplink transmission over the respective first component carriers in the group according to the TAs in the TA command, starts the TAT, maintained by the user equipment, corresponding to the group and transmits an ACK message to the eNodeB, and the eNodeB restarts the TAT, maintained by the eNodeB, corresponding to the group upon reception of the ACK message;

if the TAT, maintained by the eNodeB, corresponding to the group is time out, the eNodeB determines that the respective first component carriers in the group are out of synchronization; and if the TAT, maintained by the user equipment, corresponding to the group is time out, the user equipment determines that the respective first component carriers in the group are out of synchronization.

The invention will be described below in the following embodiments, all of which relate to the first approach, and it will be sufficient in the second approach to omit the random access procedure, and initial values of TAs of respective UL CCs for which uplink synchronization is to be performed take the value of a TA of a CC which has been synchronized.

The First Embodiment

Assumed in this embodiment the system supports five UL CCs, which are indexed with CC1, CC2, CC3, CC4 and CC5 respectively. Taking the first situation in the first approach as an example, the UE with an initial access establishes synchronization of only one UL CC and will be extended to multi-carrier transmission. A specific flow is as follows.

A step 01: The UE with a random access establishes uplink synchronization over the CC2.

A step 02: The eNodeB judges from uplink traffic of the UE that a Quality of Service (QoS) demand can be satisfied if three UL CCs are used for the UE to transmit data, for example, the CC1, the CC2 and the CC3, that is, the CC1 and the CC3 shall be newly added.

A step 03: The eNodeB transmits to the UE an RRC connection reconfiguration (RRCConnectionReconfiguration) message which includes a random access instruction message with the following contents:

if the UE is instructed to perform a non-contention random access over the CC1 and the CC3, the RRCConnectionReconfiguration message may include the indexes of the CC1 and the CC3, and the index of a preamble, ra-PreambleIndex, and the mask index of a PRACH resource, ra-PRACH-MaskIndex, used for the UE to initiate the non-contention random access over each UL CC; or if the UE is instructed to perform a contention random access for uplink synchronization, the RRCConnectionReconfiguration message may include a UL CC_INDEX, that is, the indexes of the CC1 and the CC3.

A step 04: The user receives the RRCConnectionReconfiguration message over a specific DL CC and transmits a message 1 (Msg1) which includes the random access preamble respectively over the UL CCs identified in the message.

A step 05: The eNodeB calculates uplink TAs of the CC1 and the CC3 from the Msg1 respectively upon reception of the Msg1 over the CC1 and the CC3.

A step 06: The eNodeB transmits random access responses respectively over the CC1 and the CC3 or can alternatively transmit a combined random access response in order to save an overhead, but the combined random access response shall include the TAs of the two CCs.

A step 07: The UE reads the uplink TAs of the CC1 and the CC3 from the random access response(s) upon reception of the random access response(s) over the CC1 and the CC3.

A step 08: This step is an optional step of judging a set of TAs and particularly as follows:

the eNodeB judges from the acquired uplink TAs of the CC1 and the CC3 whether the two CCs are in the same set of TAs as the CC2.

A step 09: The random access procedure ends. It shall be noted that even if a non-contention random access is performed, the random access procedure can end after the UE receives the message 2 without transmitting the messages 3 and 4 because the random access here is for the purpose of acquiring an uplink TA.

Figure 1:
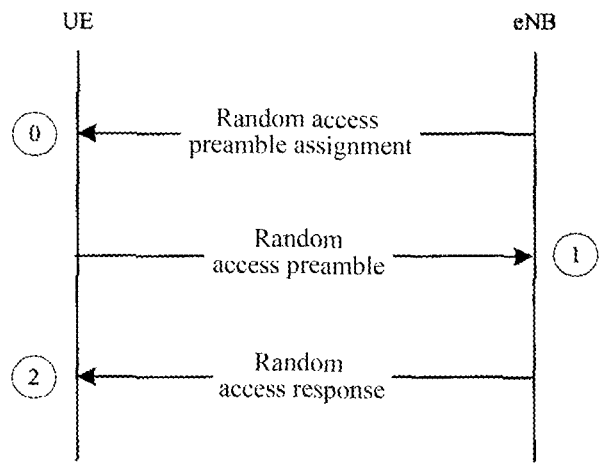
FIG. 1 is a schematic flow chart of a non-contention random access in the prior art.
Figure 2:
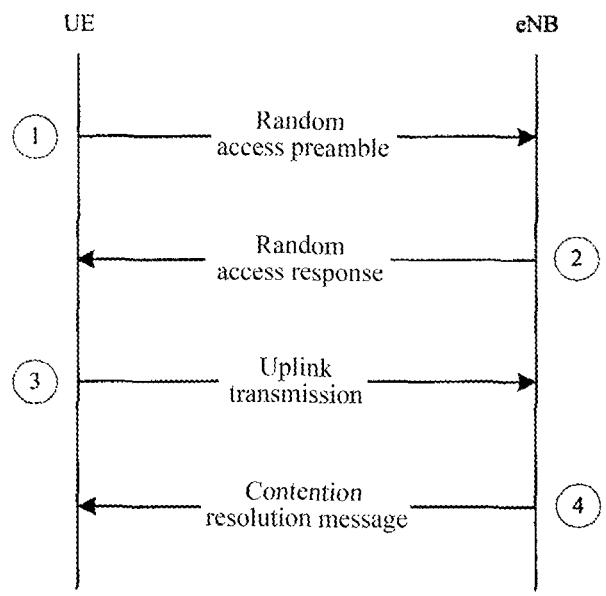
FIG. 2 is a schematic flow chart of a contention random access in the prior art.
Figure 3:
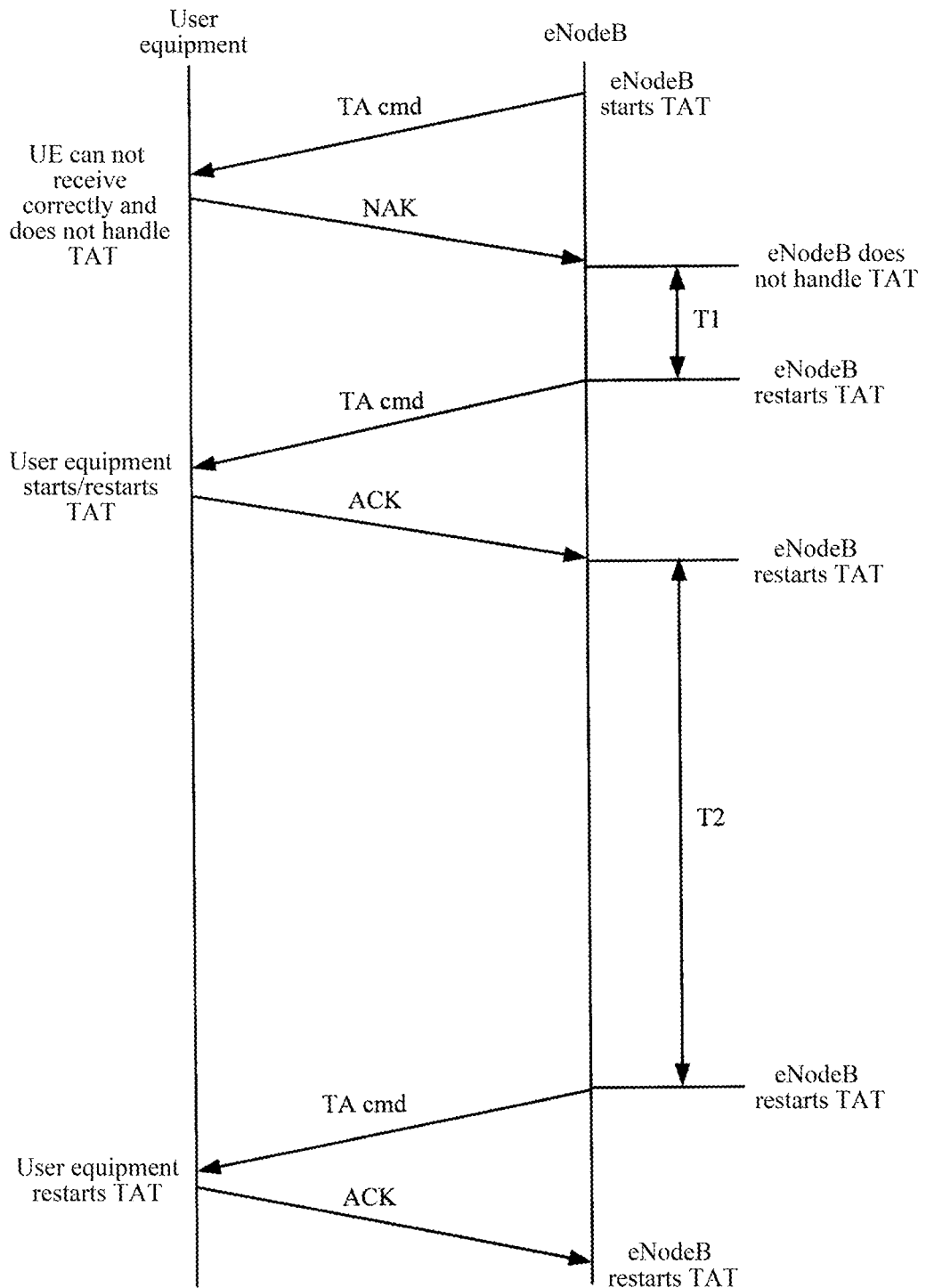
FIG. 3 is a schematic flow chart of uplink synchronization maintenance in the prior art.

Subsequently the eNodeB maintains uplink synchronization for each CC/each set of TAs, and a maintenance process of uplink synchronization over each CC is performed as in the approach as illustrated in FIG. 3.

Processes for the second and third situations in the first approach are similar to the first situation, and a repeated description will be omitted here.

The Second Embodiment

Assumed in this embodiment the system supports five UL CCs, which are indexed with CC1, CC2, CC3, CC4 and CC5 respectively. For the fourth situation in the first approach, the number of carriers over which data is transmitted will be increased due to an increased amount of data for the same service of the UE. A specific flow is as follows.

A step 11: A set of available carriers initially configured for the QoS requested by the UE includes the CC1, the CC2 and the CC3. The amount of service data is small for a period of time, and then the UE deactivates the CC1 and the CC3 but transmits data over the CC2.

A step 12: The service fluctuates, and when there is burst data incoming, the eNodeB judges from a change to the amount of uplink service data that the QoS demand can be satisfied if three carriers are used for the UE to transmit the data and then activates the CC1 and the CC3.

Figure 7:
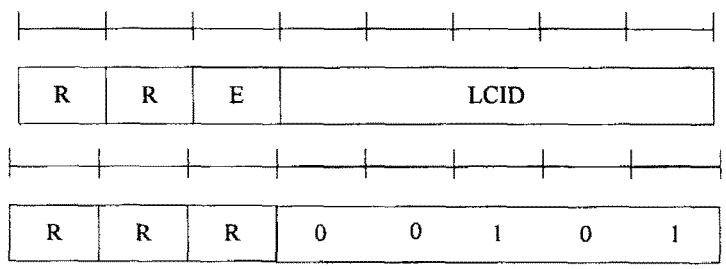
FIG. 7 is a schematic structural diagram of an MAC CE according to a second embodiment of the invention.

A step 13: The eNodeB triggers a random access procedure over the CC1 and the CC3 at the MAC layer:

if the UE is instructed to perform a non-contention random access over the CC1 and the CC3, the non-contention random access flow of an LTE system can be used here, and the indexes CC_INDEX of the CC1 and the CC3, and the index of a preamble, ra-PreambleIndex, and the mask index of a PRACH resource, ra-PRACH-MaskIndex, used for the UE to initiate the non-contention random access over each UL CC are carried over a PDCCH; or if the UE is instructed to perform a contention random access for uplink synchronization, the UE can be instructed with a new random access MAC CE to initiate the random access over the CC1 and the CC3, as illustrated in FIG. 7.

A step 14: The UE transmits a Msg1 including the random access preamble over the specified carriers CC1 and CC3 upon reception of a Msg0 instruction or a random access MAC CE instruction transmitted over the PDCCH.

A step 15: The eNodeB calculates uplink TAs of the CC1 and the CC3 from the Msg1 respectively upon reception of the Msg1 over the CC1 and the CC3.

A step 16: The eNodeB transmits random access responses respectively over the CC1 and the CC3 or can alternatively transmit a combined random access response in order to save an overhead, but the combined random access response shall include the timing advances of the two CCs.

A step 17: The UE reads the TAs of the CC1 and the CC3 from the random access response(s) upon reception of the random access response(s) over the CC1 and the CC3.

A step 18: This step is an optional step of judging a set of TAs and particularly as follows:

the eNodeB judges from the acquired uplink TAs of the CC1 and the CC3 whether the two CCs are in the same set of TAs as the CC2.

A step 19: The random access procedure ends. It shall be noted that even if a non-contention random access is performed, the random access procedure can end after the UE receives the message 2 without transmitting the messages 3 and 4 because the random access here is for the purpose of acquiring an uplink TA.

Subsequently the eNodeB maintains uplink synchronization for each CC/each set of TAs, and a maintenance process of uplink synchronization over each CC is performed as in the approach as illustrated in FIG. 3.

Respective implementations of the eNodeB and the user equipment will be described below based upon the foregoing implementations.

Steps at the eNodeB to perform uplink synchronization in a multi-carrier system can include:

the eNodeB selects one or more first component carriers which have not acquired uplink synchronization with the eNodeB from a plurality of component carriers supported by the user equipment;

the eNodeB acquires a TA of the first component carrier; and the eNodeB transmits the TA of the first component carrier to the user equipment to instruct the user equipment to perform uplink transmission over the first component carrier according to the TA.

In an implementation, the eNodeB can acquire the TA of the first component carrier in the following first approach or second approach.

In the first approach, the eNodeB transmits random access related instruction signaling which includes the identifier of the first component carrier to the user equipment, and the eNodeB calculates the TA used for the user equipment to perform uplink transmission over the first component carrier upon reception of a random access preamble transmitted from the user equipment to the eNodeB over the first component carrier.

In the second approach, the eNodeB determines a second component carrier among the plurality of component carriers which has acquired uplink synchronization with the eNodeB and determines a TA used to perform uplink transmission over the second component carrier as the TA used to perform uplink transmission over the first component carrier.

In an implementation, the eNodeB can further perform the following step before transmitting the random access related instruction signaling to the user equipment:

the eNodeB carries ra-PreambleIndex used over each first component carrier and ra-PRACH-MaskIndex for a random access in the random access related instruction signaling;

the random access preamble is a random access preamble corresponding to the ra-PreambleIndex transmitted from the user equipment to the eNodeB over the first component carrier identified by the identifier of the first component carrier over a PRACH resource indicated by the ra-PRACH-MaskIndex.

In an implementation, the random access related instruction signaling includes:

RRC signaling or signaling conveyed by PDCCH or MAC CE.

In an implementation, the MAC CE can include:

an LCID field and a component carrier identifier field, where the LCID field carries information indicating that the MAC CE is an MAC CE instructing the user equipment to perform uplink synchronization, and the component carrier identifier field carries the identifier of the first component carrier.

In an embodiment, the eNodeB can further perform the following step before acquiring the TA of the first component carrier:

the eNodeB determines the first approach or the second approach for use in determining the TA of the first component carrier according to one or any combination of network configuration of the multi-carrier system, the capability of the user equipment and statistic information of the TAs used to perform uplink transmission over the component carriers supported by the user equipment.

In an implementation, the eNodeB can further perform the following steps after the user equipment performs uplink transmission over the first component carrier according to the TA:

the eNodeB performs the following steps for each first component carrier:

the eNodeB transmits a TA command to the user equipment and starts an uplink synchronization timer TAT, maintained by the eNodeB, corresponding to the first component carrier at a preset interval of time which is shorter than a length of timing of the TAT;

if the eNodeB receives a Negative Acknowledgement (NACK) message transmitted from the user equipment due to incorrect reception of the TA command, the eNodeB retransmits a TA command to the user equipment and restarts the TAT, maintained by the eNodeB, corresponding to the first component carrier; or if the eNodeB receives an Acknowledgement (ACK) message transmitted from the user equipment due to correct reception of the TA command, the eNodeB restarts the TAT, maintained by the eNodeB, corresponding to the first component carrier; and if the TAT, maintained by the eNodeB, corresponding to the first component carrier is time out, the eNodeB determines that the first component carrier is out of synchronization.

In an implementation, the eNodeB can further perform the following steps after the user equipment performs uplink transmission over the first component carrier according to the TA:

when the user equipment classifies the first component carriers into groups and TA differences of the first component carriers in one group do not exceed a preset threshold, the eNodeB performs the following steps for each group:

the eNodeB transmits a TA command to the user equipment and starts a TAT, maintained by the eNodeB, corresponding to the group at a preset interval of time which is shorter than a length of timing of the TAT;

if the eNodeB receives an NACK message transmitted from the user equipment due to incorrect reception of the TA command, the eNodeB retransmits a TA command to the user equipment and restarts the TAT, maintained by the eNodeB, corresponding to the group; or if the eNodeB receives an ACK message transmitted from the user equipment due to correct reception of the TA command, the eNodeB restarts the TAT, maintained by the eNodeB, corresponding to the group; and if the TAT, maintained by the eNodeB, corresponding to the group is time out, the eNodeB determines that the respective first component carriers in the group are out of synchronization.

Steps at the user equipment to perform uplink synchronization in a multi-carrier system can include:

the user equipment receives a TA of one or more first component carriers transmitted from the eNodeB, where the first component carrier is such a component carrier among a plurality of component carriers supported by the user equipment that has no uplink synchronization established with the eNodeB; and the user equipment performs uplink transmission over the first component carrier according to the TA.

In an implementation, the user equipment can further perform the following step:

the user equipment transmits a random access preamble to the eNodeB over the first component carrier.

In an implementation, the user equipment can further perform the following step:

the user equipment receives random access related instruction signaling, transmitted from the eNodeB, including ra-PreambleIndex used over each first component carrier and ra-PRACH-MaskIndex for a random access, and the random access preamble is a random access preamble corresponding to the ra-PreambleIndex transmitted from the user equipment to the eNodeB over the first component carrier identified by the identifier of the first component carrier over a PRACH resource indicated by the ra-PRACH-MaskIndex; or the user equipment selects a random access preamble and a PRACH resource for a random access and transmits the selected random access preamble to the eNodeB over the first component carrier over the selected PRACH resource.

In an implementation, the random access related instruction signaling may includes:

RRC signaling or signaling conveyed by PDCCH or MAC CE.

In an implementation, the MAC CE can include:

an LCID field and a component carrier identifier field, where the LCID field carries information indicating that the MAC CE is an MAC CE instructing the user equipment to perform uplink synchronization, and the component carrier identifier field carries the identifier of the first component carrier.

In an implementation, the user equipment can further perform the following steps after performing uplink transmission over the first component carrier according to the TA:

if the user equipment does not receive correctly a TA command transmitted from the eNodeB, the user equipment transmits an NACK message to the eNodeB; or if the user equipment receives correctly a TA command transmitted from the eNodeB, the user equipment starts a maintained TAT corresponding to the first component carrier and transmits an ACK message to the eNodeB; and if the TAT, maintained by the user equipment, corresponding to the first component carrier is time out, the user equipment determines that the first component carrier is out of synchronization.

In an implementation, the user equipment can further perform the following steps after performing uplink transmission over the first component carrier according to the TA:

the user equipment classifies the respective first component carriers into groups; and the user equipment performs the following steps for each group:

if the user equipment does not receive correctly a TA command transmitted from the eNodeB, the user equipment transmits an NACK message to the eNodeB; or if the user equipment receives correctly a TA command transmitted from the eNodeB, the user equipment starts a maintained TAT corresponding to the group and transmits an ACK message to the eNodeB; and if the TAT, maintained by the user equipment, corresponding to the group is time out, the user equipment determines that the respective first component carriers in the group are out of synchronization.

Based upon the same inventive idea, embodiments of the invention further provide a multi-carrier system, an eNodeB and a user equipment, and since these devices address the problem on the same principle as the uplink synchronization method in a multi-carrier system, reference can be made to the implementation of the method for implementations of these devices, and a repeated description will be omitted here.

Figure 8:
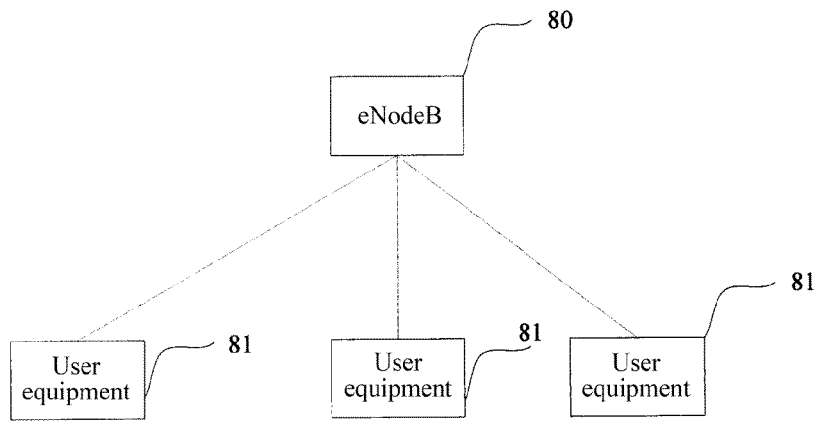
FIG. 8 is a schematic structural diagram of a system according to an embodiment of the invention.

Referring to FIG. 8, an embodiment of the invention further provides a multi-carrier system including:

an eNodeB 80 configured to select one or more first component carriers which have not acquired uplink synchronization with the eNodeB from a plurality of component carriers supported by a user equipment, transmit an identifier of the first component carrier to the user equipment, acquire a TA of the first component carrier, and transmit the TA of the first component carrier to the user equipment; and the user equipment 81 configured to perform uplink transmission over the first component carrier according to the TA.

The eNodeB 80 is configured to judge whether the first component carrier uses the same TA as a second component carrier which has acquired uplink synchronization with the eNodeB, and if the first component carrier does not use the same TA as the second component carrier, transmit random access related instruction signaling including the identifier of the first component carrier to the user equipment; otherwise, determine a TA used to perform uplink transmission over the second component carrier and transmit this TA to the user equipment as the TA used to perform uplink transmission over the first component carrier; and to calculate the TA used for the user equipment to perform uplink transmission over the first component carrier upon reception of a random access preamble transmitted from the user equipment, and transmit a random access response including the TA to the user equipment.

Correspondingly, the user equipment 81 is configured to transmit the random access preamble to the eNodeB over the first component carrier upon reception of the random access related instruction signaling.

The eNodeB 80 is further configured to include ra-PreambleIndex used over each first component carrier and ra-PRACH-MaskIndex for a random access in the random access related instruction signaling.

Correspondingly, the user equipment 81 is configured to transmit the random access preamble corresponding to the ra-PreambleIndex to the eNodeB over the first component carrier identified by the identifier of the first component carrier over a PRACH resource indicated by the ra-PRACH-MaskIndex.

The user equipment 81 is configured to select a random access preamble and a PRACH resource for a random access and transmit the selected random access preamble to the eNodeB over the first component carrier over the selected PRACH resource.

The eNodeB 80 is further configured, for each first component carrier, to transmit a TA command to the user equipment and start a TAT, maintained by the eNodeB, corresponding to the first component carrier at a preset interval of time which is shorter than a length of timing of the TAT; to retransmit, upon reception of an NACK message transmitted from the user equipment for the TA command, a TA command to the user equipment and restart the TAT, maintained by the eNodeB, corresponding to the first component carrier, or to restart, upon reception of an ACK message transmitted from the user equipment for the TA command, the TAT, maintained by the eNodeB, corresponding to the first component carrier; and to determine that the first component carrier is out of synchronization when the TAT, maintained by the eNodeB, corresponding to the first component carrier is time out.

Correspondingly, the user equipment 81 is further configured to transmit the Negative Acknowledgement (NACK) message to the eNodeB upon incorrect reception of the TA command or to start a TAT, maintained by the user equipment, corresponding to the first component carrier and transmit the Acknowledgement (ACK) message to the eNodeB upon correct reception of the TA command; and to determine that the first component carrier is out of synchronization when the TAT, maintained by the user equipment, corresponding to the first component carrier is time out.

The eNodeB 80 is further configured to classify the respective first component carriers into groups so that TA differences of the first component carriers in one group do not exceed a preset threshold; and for each group, to transmit a TA command to the user equipment and start a TAT, maintained by the eNodeB, corresponding to the group at a preset interval of time which is shorter than a length of timing of the TAT; to retransmit, upon reception of an NACK message transmitted from the user equipment for the TA command, a TA command to the user equipment and restart the TAT, maintained by the eNodeB, corresponding to the group, or to restart, upon reception of an ACK message transmitted from the user equipment for the TA command, the TAT, maintained by the eNodeB, corresponding to the group; and to determine that the respective first component carriers in the group are out of synchronization when the TAT, maintained by the eNodeB, corresponding to the group is time out.

Correspondingly, the user equipment 81 is further configured to transmit the Negative Acknowledgement (NACK) message to the eNodeB upon incorrect reception of the TA command, or to start a TAT, maintained by the user equipment, corresponding to the group and transmit the Acknowledgement (ACK) message to the eNodeB upon correct reception of the TA command; and to determine that the respective first component carriers in the group are out of synchronization when the TAT, maintained by the user equipment, corresponding to the group is time out.

Figure 9:
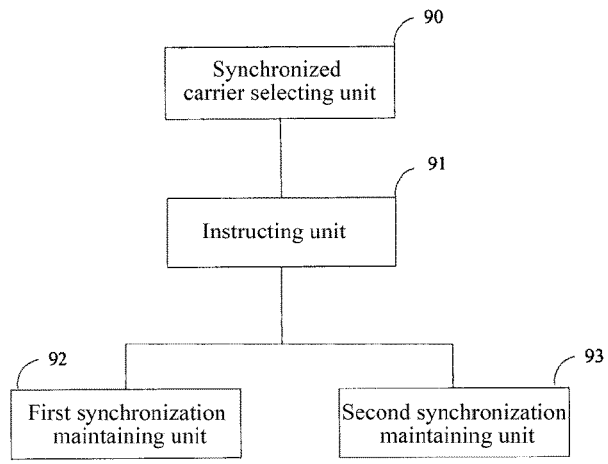
FIG. 9 is a schematic structural diagram of an eNodeB according to an embodiment of the invention.

Referring to FIG. 9, an embodiment of the invention further provides an eNodeB which can be applicable to a multi-carrier system and which includes:

a synchronized carrier selecting unit 90 configured to select one or more first component carriers which have not acquired uplink synchronization with the eNodeB from a plurality of component carriers supported by a user equipment; and an instructing unit 91 configured to acquire a TA of the first component carrier, and transmit the TA of the first component carrier to the user equipment to instruct the user equipment to perform uplink transmission over the first component carrier according to the TA.

In an implementation, the instructing unit can further be configured to acquire the TA of the first component carrier by transmitting random access related instruction signaling including an identifier of the first component carrier to the user equipment and calculating the TA used for the user equipment to perform uplink transmission over the first component carrier upon reception of a random access preamble transmitted from the user equipment to the eNodeB over the first component carrier, or by determining a second component carrier among the plurality of component carriers which has acquired uplink synchronization with the eNodeB and determining a TA used to perform uplink transmission over the second component carrier as the TA used to perform uplink transmission over the first component carrier.

In an implementation, the instructing unit can further be configured to determine the first component carrier or the second component carrier for use in determining the TA of the first component carrier according to one or any combination of network configuration of the multi-carrier system, the capability of the user equipment and statistic information of TAs used to perform uplink transmission over the component carriers supported by the user equipment.

The instructing unit 91 is configured to include the identifier of the first component carrier in random access related instruction signaling and transmit the signaling to the user equipment to instruct the user equipment to transmit a random access preamble over the first component carrier; and to calculate the TA for the user equipment to perform uplink transmission over the first component carrier upon reception of the random access preamble transmitted from the user equipment over the first component carrier, and transmit a random access response including the TA to the user equipment.

The instructing unit 91 is further configured to include ra-PreambleIndex used over each first component carrier and ra-PRACH-MaskIndex for a random access in the random access related instruction signaling to instruct the user equipment to transmit the random access preamble corresponding to the ra-PreambleIndex to the eNodeB over a PRACH resource corresponding to the ra-PRACH-MaskIndex.

That is, in an implementation, the instruction unit can further be configured to include the ra-PreambleIndex used over each first component carrier and the ra-PRACH-MaskIndex for the random access in the random access related instruction signaling before transmitting the random access related instruction signaling to the user equipment; and the random access preamble is a random access preamble corresponding to the ra-PreambleIndex transmitted from the user equipment to the eNodeB over the first component carrier identified by the identifier of the first component carrier over a PRACH resource indicated by the ra-PRACH-MaskIndex.

The instructing unit can further be configured to transmit RRC signaling or signaling conveyed by a PDCCH or MAC CE as the random access related instruction signaling to the user equipment.

The instructing unit can further be configured to include information in an LCID field in the MAC CE to indicate that the MAC CE is an MAC CE instructing the user equipment to perform uplink synchronization, and to include the identifier of the first component carrier in a component carrier identifier field in the MAC CE.

The eNodeB further includes a first synchronization maintaining unit 92 and/or a second synchronization maintaining unit 93.

The first synchronization maintaining unit 92 is configured, for each first component carrier, to transmit a TA command to the user equipment and start a TAT, maintained by the eNodeB, corresponding to the first component carrier at a preset interval of time which is shorter than a length of timing of the TAT; to retransmit, upon reception of an NACK message transmitted from the user equipment for the TA command, a TA command to the user equipment and restart the TAT, maintained by the eNodeB, corresponding to the first component carrier, or to restart, upon reception of an ACK message transmitted from the user equipment for the TA command, the TAT, maintained by the eNodeB, corresponding to the first component carrier; and to determine that the first component carrier is out of synchronization when the TAT, maintained by the eNodeB, corresponding to the first component carrier is time out.

That is, the first synchronization maintaining unit is configured, for each first component carrier, to transmit a TA command to the user equipment and start a maintained TAT corresponding to the first component carrier at a preset interval of time which is shorter than a length of timing of the TAT; to retransmit, upon reception of an NACK message transmitted from the user equipment due to incorrect reception of the TA command, a TA command to the user equipment and restart the maintained TAT corresponding to the first component carrier, or to restart, upon reception of an ACK message transmitted from the user equipment due to correct reception of the TA command, the maintained TAT corresponding to the first component carrier; and to determine that the first component carrier is out of synchronization when the maintained TAT corresponding to the first component carrier is time out.

The second synchronization maintaining unit 93 is configured to classify the respective first component carriers into groups so that TA differences of the first component carriers in one group do not exceed a preset threshold; and for each group, to transmit a TA command to the user equipment and start a TAT, maintained by the eNodeB, corresponding to the group at a preset interval of time which is shorter than a length of timing of the TAT; to retransmit, upon reception of an NACK message transmitted from the user equipment for the TA command, a TA command to the user equipment and restart the TAT, maintained by the eNodeB, corresponding to the group, or to restart, upon reception of an ACK message transmitted from the user equipment for the TA command, the TAT, maintained by the eNodeB, corresponding to the group; and to determine that the respective first component carriers in the group are out of synchronization when the TAT, maintained by the eNodeB, corresponding to the group is time out.

That is, the second synchronization maintaining unit is configured, when the user equipment classifies the respective first component carriers into groups so that TA differences of the first component carriers in one group do not exceed a preset threshold, and for each group, to transmit a TA command to the user equipment and start a maintained TAT corresponding to the group at a preset interval of time which is shorter than a length of timing of the TAT; to retransmit, upon reception of an NACK message transmitted from the user equipment due to incorrect reception of the TA command, a TA command to the user equipment and restart the maintained TAT corresponding to the group, or to restart, upon reception of an ACK message transmitted from the user equipment due to correct reception of the TA command, the maintained TAT corresponding to the group; and to determine that the respective first component carriers in the group are out of synchronization when the maintained TAT corresponding to the group is time out.

Figure 10:
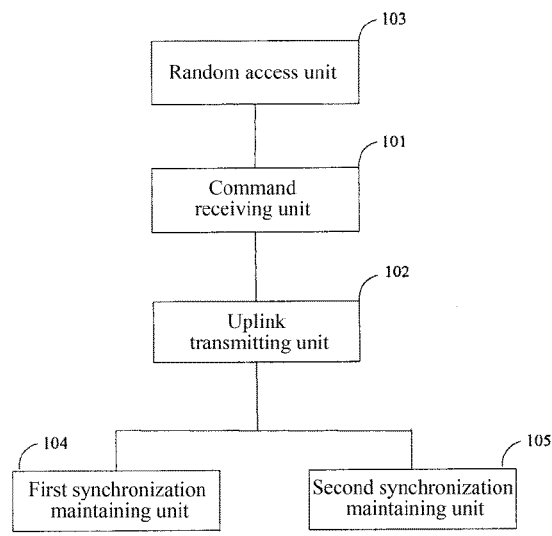
FIG. 10 is a schematic structural diagram of a user equipment according to an embodiment of the invention.

Referring to FIG. 10, an embodiment of the invention further provides a user equipment which can be applicable to a multi-carrier system and which includes:

a command receiving unit 101 configured to receive a TA of one or more first component carriers transmitted from an eNodeB, where the first component carrier is such a component carrier among a plurality of component carriers supported by the user equipment that has no uplink synchronization established with the eNodeB; and an uplink transmitting unit 102 configured to perform uplink transmission over the first component carrier according to the TA.

The user equipment further includes:

a random access unit 103 configured to transmit a random access preamble to the eNodeB over the first component carrier upon reception of random access related instruction signaling, transmitted from the eNodeB, including an identifier of the first component carrier.

Correspondingly, the command receiving unit 101 is configured to read the TA used to perform uplink transmission over the first component carrier from a random access response transmitted from the eNodeB upon reception of the random access response.

The random access unit 103 is configured to read from the random access related instruction signaling the identifier of the first component carrier over which a random access is to be performed, ra-PreambleIndex and ra-PRACH-MaskIndex for the random access and transmit the random access preamble corresponding to the ra-PreambleIndex to the eNodeB over the first component carrier over a PRACH resource indicated by the ra-PRACH-MaskIndex.

The random access unit 103 is configured to select a random access preamble and a PRACH resource for a random access and transmit the selected random access preamble to the eNodeB over the first component carrier over the selected PRACH resource.

The user equipment further includes:

a first synchronization maintaining unit 104 configured to transmit an NACK message to the eNodeB upon incorrect reception of a TA command transmitted from the eNodeB for the first component carrier, or to start a TAT, maintained by the user equipment, corresponding to the first component carrier and transmit an ACK message to the eNodeB upon correct reception of the TA command; and to determine that the first component carrier is out of synchronization when the TAT, maintained by the user equipment, corresponding to the first component carrier is time out; and a second synchronization maintaining unit 105 configured to transmit an NACK message to the eNodeB upon incorrect reception of a TA command transmitted from the eNodeB for a group including one or more of the first component carriers, or to start a TAT, maintained by the user equipment, corresponding to the group and transmit an ACK message to the eNodeB upon correct reception of the TA command; and to determine that the respective first component carriers in the group are out of synchronization when the TAT, maintained by the user equipment, corresponding to the group is time out.

As can be apparent from the foregoing embodiments, in the technical solutions according to the embodiments of the invention, an eNodeB selects one or more first component carriers which have not acquired uplink synchronization with the eNodeB from a plurality of component carriers supported by a user equipment and transmits a TA of the first component carrier to the user equipment, and the user equipment performs uplink transmission over the first component carrier according to the TA. Apparently the technical solutions according to the embodiments of the invention can establish uplink synchronization between the eNodeB and the UE in the multi-carrier system.

It will be appreciated that one skilled in the art may make various modifications and alterations to the present invention without departing from the scope of the present invention. Accordingly, if these modifications and alterations to the present invention fall within the scope of the claims of the present invention and their equivalents, the present invention intends to include all these modifications and alterations.

The invention claimed is:

1. An uplink synchronization method in a multi-carrier system, comprising:
  selecting, by an eNodeB, one or more first component carriers which have not acquired uplink synchronization with the eNodeB from a plurality of component carriers supported by a user equipment;
  acquiring, by the eNodeB, a Timing Advance, TA, of the first component carrier; and
  transmitting, by the eNodeB, the TA of the first component carrier to the user equipment to instruct the user equipment to perform uplink transmission over the first component carrier according to the TA,
  wherein acquiring by the eNodeB the TA of the first component carrier in the following first approach or second approach:
  in the first approach, the eNodeB transmits random access related instruction signaling which includes an identifier of the first component carrier to the user equipment, and the eNodeB calculates the TA for the user equipment to perform uplink transmission over the first component carrier upon reception of a random access preamble transmitted from the user equipment to the eNodeB over the first component carrier; and in the second approach, the eNodeB determines a second component carrier among the plurality of component carriers which has acquired uplink synchronization with the eNodeB and determines a TA used to perform uplink transmission over the second component carrier as the TA used to perform uplink transmission over the first component carrier.

2. The method according to claim 1, further comprising: before the eNodeB transmits the random access related instruction signaling to the user equipment, including, by the eNodeB, in the random access related instruction signaling an index of the random access preamble, ra-PreambleIndex, used over each first component carrier and a mask index of a physical random access channel resource for a random access, ra-PRACH-MaskIndex; and the random access preamble is a random access preamble corresponding to the ra-PreambleIndex transmitted from the user equipment to the eNodeB over the first component carrier identified by the identifier of the first component carrier over the PRACH resource indicated by the ra-PRACH-MaskIndex.

3. The method according to claim 1, wherein the random access related instruction signaling comprises:

Radio Resource Control, RRC, signaling, or signaling conveyed by a Physical Downlink Control Channel, PDCCH, or signaling conveyed by the Media Access Control Element, MAC CE.

4. The method according to claim 3, wherein the MAC CE comprises:

a Logical Channel Identifier, LCID, field and a component carrier identifier field, wherein the LCID field carries information indicating that the MAC CE is an MAC CE instructing the user equipment to perform uplink synchronization, and the component carrier identifier field carries the identifier of the first component carrier.

5. The method according to claim 1, further comprising: before the eNodeB acquires the TA of the first component carrier, determining, by the eNodeB, the first approach or the second approach for use in determining the TA of the first component carrier according to one or any combination of network configuration of the multi-carrier system, the capability of the user equipment and statistic information of TAs used to perform uplink transmission over the component carriers supported by the user equipment.

6. The method according to claim 1, further comprising: after the user equipment performs uplink transmission over the first component carrier according to the TA, for each first component carrier:

transmitting, by the eNodeB, a Timing Advance, TA, command to the user equipment and starting an uplink synchronization timer, TAT, maintained by the eNodeB, corresponding to the first component carrier at a preset interval of time which is shorter than a length of timing of the TAT;

if the eNodeB receives a Negative Acknowledgement, NACK, message transmitted from the user equipment due to incorrect reception of the TA command, the eNodeB retransmitting a TA command to the user equipment and restarting the TAT, maintained by the eNodeB, corresponding to the first component carrier; or if the eNodeB receives an Acknowledgement, ACK, message transmitted from the user equipment due to correct reception of the TA command, the eNodeB restarting the TAT, maintained by the eNodeB, corresponding to the first component carrier; and if the TAT, maintained by the eNodeB, corresponding to the first component carrier is time out, the eNodeB determining that the first component carrier is out of synchronization.

7. The method according to claim 1, further comprising: after the user equipment performs uplink transmission over the first component carrier according to the TA, when the user equipment classifies the respective first component carriers into groups and TA differences of the first component carriers in one group do not exceed a preset threshold:

transmitting, by the eNodeB, a TA command to the user equipment and starting a TAT, maintained by the eNodeB, corresponding to the group at a preset interval of time which is shorter than a length of timing of the TAT;

if the eNodeB receives an NACK message transmitted from the user equipment due to incorrect reception of the TA command, the eNodeB retransmitting a TA command to the user equipment and restarting the TAT, maintained by the eNodeB, corresponding to the group; or if the eNodeB receives an ACK message transmitted from the user equipment due to correct reception of the TA command, the eNodeB restarting the TAT, maintained by the eNodeB, corresponding to the group; and if the TAT, maintained by the eNodeB, corresponding to the group is time out, the eNodeB determining that the respective first component carriers in the group are out of synchronization.

8. An eNodeB, comprising:

a synchronized carrier selecting unit configured to select one or more first component carriers which have not acquired uplink synchronization with the eNodeB from a plurality of component carriers supported by a user equipment; and an instructing unit configured to acquire a TA of the first component carrier, and transmit the TA of the first component carrier to the user equipment to instruct the user equipment to perform uplink transmission over the first component carrier according to the TA, wherein the instructing unit is further configured to acquire the TA of the first component carrier by transmitting random access related instruction signaling including an identifier of the first component carrier to the user equipment and calculating the TA used for the user equipment to perform uplink transmission over the first component carrier upon reception of a random access preamble transmitted from the user equipment to the eNodeB over the first component carrier, or by determining a second component carrier among the plurality of component carriers which has acquired uplink synchronization with the eNodeB and determining a TA used to perform uplink transmission over the second component carrier as the TA used to perform uplink transmission over the first component carrier.

9. The eNodeB according to claim 8, wherein the instruction unit is further configured to include ra-PreambleIndex used over each first component carrier and ra-PRACH-MaskIndex for a random access in the random access related instruction signaling before transmitting the random access related instruction signaling to the user equipment; and the random access preamble is a random access preamble corresponding to the ra-PreambleIndex transmitted from the user equipment to the eNodeB over the first component carrier identified by the identifier of the first component carrier over a PRACH resource indicated by the ra-PRACH-MaskIndex.

10. The eNodeB according to claim 9, wherein the instructing unit is further configured to transmit RRC signaling or signaling conveyed by a PDCCH or MAC CE as the random access related instruction signaling to the user equipment.

11. The eNodeB according to claim 8, wherein the instructing unit is further configured to determine the first component carrier or the second component carrier for use in determining the TA of the first component carrier according to one or any combination of network configuration of the multi-carrier system, the capability of the user equipment and statistic information of TAs used to perform uplink transmission over the component carriers supported by the user equipment.

12. The eNodeB according to claim 8, wherein the eNodeB further comprises a first synchronization maintaining unit and/or a second synchronization maintaining unit, wherein:
the first synchronization maintaining unit is configured, for each first component carrier, to transmit a TA command to the user equipment and start a maintained uplink synchronization timer, TAT, corresponding to the first component carrier at a preset interval of time which is shorter than a length of timing of the TAT; to retransmit, upon reception of an NACK message transmitted from the user equipment due to incorrect reception of the TA command, a TA command to the user equipment and restart the maintained TAT corresponding to the first component carrier, or to restart, upon reception of an ACK message transmitted from the user equipment due to correct reception of the TA command, the maintained TAT corresponding to the first component carrier; and to determine that the first component carrier is out of synchronization when the maintained TAT corresponding to the first component carrier is time out; and
the second synchronization maintaining unit is configured, when the user equipment classifies the respective first component carriers into groups so that TA differences of the first component carriers in one group do not exceed a preset threshold, and for each group, to transmit a TA command to the user equipment and start a maintained TAT corresponding to the group at a preset interval of time which is shorter than a length of timing of the TAT; to retransmit, upon reception of an NACK message transmitted from the user equipment due to incorrect reception of the TA command, a TA command to the user equipment and restart the maintained TAT corresponding to the group, or to restart, upon reception of an ACK message transmitted from the user equipment due to correct reception of the TA command, the maintained TAT corresponding to the group; and to determine that the respective first component carriers in the group are out of synchronization when the maintained TAT corresponding to the group is time out.

13. A user equipment, comprising:
a command receiving unit configured to receive a TA of one or more first component carriers transmitted from an eNodeB, wherein the first component carrier is such a component carrier among a plurality of component carriers supported by the user equipment that has no uplink synchronization established with the eNodeB;
an uplink transmitting unit configured to perform uplink transmission over the first component carrier according to the TA; and
a random access unit configured to transmit a random access preamble to the eNodeB over the first component carrier upon reception of random access related instruction signaling, transmitted from the eNodeB, including an identifier of the first component carrier,
and wherein the command receiving unit is further configured to read the TA used to perform uplink transmission over the first component carrier from a random access response transmitted from the eNodeB upon reception of the random access response.

14. The user equipment according to claim 13, wherein the random access unit is further configured to receive the random access related instruction signaling, transmitted from the eNodeB, including ra-PreambleIndex used over each first component carrier and ra-PRACH-MaskIndex for a random access, wherein the random access preamble is a random access preamble corresponding to the ra-PreambleIndex transmitted to the eNodeB over the first component carrier identified by the identifier of the first component carrier over a PRACH resource indicated by the ra-PRACH-MaskIndex; or to select a random access preamble and a PRACH resource for a random access and transmit the selected random access preamble to the eNodeB over the first component carrier over the selected PRACH resource.

15. The user equipment according to claim 14, wherein the command receiving unit is further configured to receive the random access related instruction signaling comprising RRC signaling or signaling conveyed by a PDCCH or MAC CE.

16. The user equipment according to claim 15, wherein the command receiving unit is further configured to receive the MAC CE, wherein information carried in an LCID field in the MAC CE indicates that the MAC CE is an MAC CE instructing the user equipment to perform uplink synchronization, and the identifier of the first component carrier is carried in a component carrier identifier field in the MAC CE.

17. The user equipment according to claim 13, wherein the user equipment further comprises a first synchronization maintaining unit and/or a second synchronization maintaining unit, wherein:
the first synchronization maintaining unit is configured to transmit an NACK message to the eNodeB upon incorrect reception of a TA command transmitted from the eNodeB, or to start a maintained TAT corresponding to the first component carrier and transmit an ACK message to the eNodeB upon correct reception of a TA command transmitted from the eNodeB; and to determine that the first component carrier is out of synchronization when the maintained TAT corresponding to the first component carrier is time out, after uplink transmission is performed over the first component carrier according to the TA; and
the second synchronization maintaining unit is configured to classify the respective first component carriers into groups after uplink transmission is performed over the first component carrier according to the TA; to transmit an NACK message to the eNodeB upon incorrect reception of a TA command transmitted from the eNodeB, or to start a maintained TAT corresponding to the group and transmit an ACK message to the eNodeB upon correct reception of a TA command transmitted from the eNodeB; and to determine that the respective first component carriers in the group are out of synchronization when the maintained TAT corresponding to the group is time out.

* * * * *